Jan. 30, 1968     E. M. ALLEN     3,366,789
CALIBRATION OF ULTRAVIOLET RADIATION SOURCES
Filed Feb. 12, 1964
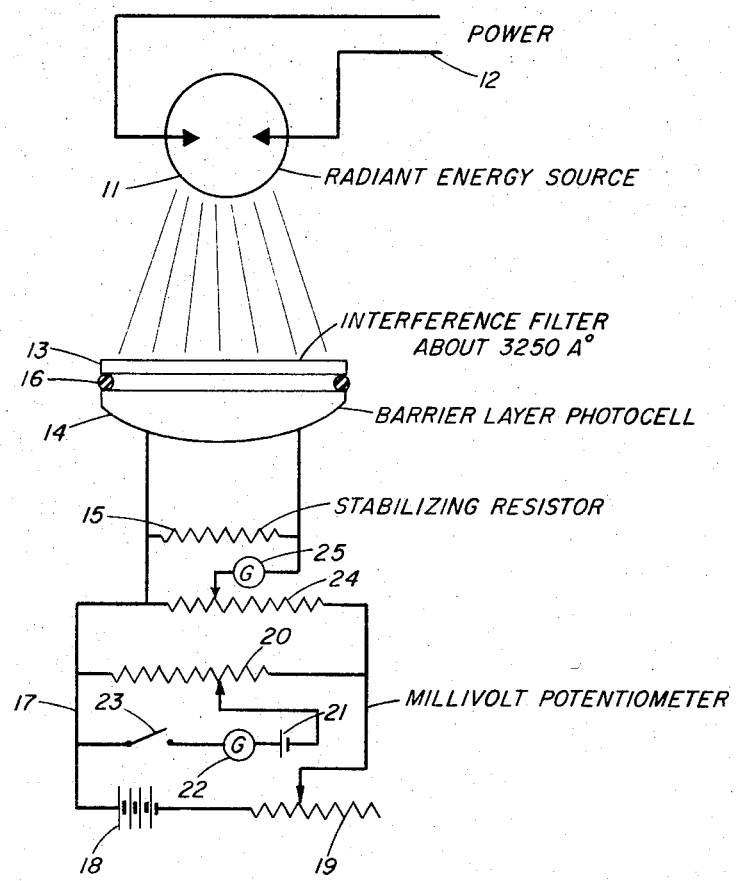
INVENTOR.
EUGENE MURRAY ALLEN
BY
*Samuel Branck Walker*
ATTORNEY United States Patent Office 3,366,789
Patented Jan. 30, 1968

3,366,789
CALIBRATION OF ULTRAVIOLET
RADIATION SOURCES
Eugene Murray Allen, Hillside, N.J., assignor to American Cyanamid Company, New York, N.Y., a corporation of Maine
Filed Feb. 12, 1964, Ser. No. 344,382
1 Claim. (Cl. 250—83.3)

This invention relates to a method and apparatus for calibrating the energy emission level of light sources and, more particularly, to high intensity light sources used for exposure testing devices used for the study of the effect of radiation and weathering on materials.

Many materials, including plastics, paints, dyes, textiles, stabilizers for many of these, and items constructed from or finished with paints or plastics are affected by sunlight and weathering. Obviously, for laboratory work, it is highly desirable to be able to obtain experimental data on the weathering characteristics of test samples in as short a time as possible so that future experimentation or modifications of formulations can be predicated on experimental evidence. In laboratory work it is desirable to be able to control the variables to permit the evaluation of the effect of one change on a result. The first tests, of course, are historical where various materials were found to withstand weather empirically. Unfortunately, weathering conditions in nature are seldom uniform and hence, resistance to weathering could be evaluated only by comparison between duplicate samples concurrently evaluated.

For accelerated weathering tests, a laboratory is preferred which has controlled environmental conditions, which are stable and reproducible, and which gives faster results comparable to actual outdoor weathering tests. This requires a knowledge of the components affecting aging, and simulation of these conditions.

One of the hardest to control has been radiation, particularly light in the visible region and ultraviolet radiation. A big problem in weathering techniques has been to determine which radiation bands are of primary interest and to control the intensity of the radiation in this region. For many purposes the ultraviolet just shorter than the visible in the range of about 3000 to 4500 Angstroms is particularly critical. Studies on the wavelengths of interest are reported in such publications as R. C. Hirt, N. Z. Searle and R. G. Schmitt, "Ultraviolet Degradation of Plastics and the Use of Protective Ultraviolet Absorbers," Society of Plastics Engineers Transactions, vol. 1, No. 1, January 1961; R. C. Hirt, R. G. Schmitt, N. D. Searle, and A. P. Sullivan, "Ultraviolet Spectral Energy Distributions of Natural Sunlight and Accelerated Test Light Sources," The Journal of the Optical Society of America, vol. 50, No. 7, 706–713, July 1960; R. G. Schmitt and R. C. Hirt, "Investigation of the Protective Ultraviolet Absorbers in a Space Environment. I. Rate of Evaporation and Vapor Pressure Studies," Journal of Polymer Science, vol. XLV, pages 35–47 (1960); R. G. Schmitt and R. C. Hirt, "Investigation of the Protective Ultraviolet Absorbers in a Space Environment. II. Photochemical Studies," Journal of Polymer Science, vol. 61, pages 361–380 (1962); and R. G. Schmitt and R. C. Hirt, "Investigation of the Protective Ultraviolet Absorbers in a Space Environment. III. Protective Effectiveness," Journal of Applied Polymer Science, vol. 7, pages 1565–1580 (1963).

It has now been found that a highly accurate measure of effective radiation may be made by using an interference filter with a selected pass band protecting a barrier layer photocell, which is shunted with a stabilizing resistor to give comparatively straight line output with the output being measured with a millivolt potentiometer.

When calibrated and used under normal conditions, the output of the potentiometer can be read to at least three significant figures. The potential measurement itself is thus clearly of high accuracy and precision. The stability of the complete system when in constant use for an hour a day gives a relative change of less than 4% per year. This is a degree of precision which is phenomenal in such testing. The results are so accurate that no reasonable means are available to confirm accuracy.

It is to be understood that the choice of pass band can vary depending upon the exact wavelength selected for a particular use and that the sensitivity can be increased or decreased for a selected use. The details of possible uses are obvious to those skilled in the art. The apparatus is illustrated in the accompanying figure and described in detail in connection with a particular embodiment.

In the drawing:

FIGURE 1 is a diagrammatic view of the light source calibrator.

A radiant energy source 11 is driven from a power source 12. Typically the radiant energy source is a high intensity source such as a xenon arc or mercury arc. Typically these may be from 1,000 to 10,000 watts intensity. Part of the radiated energy impinges on an interference filter 13. Although other types of filters may be used to allow transmittance of radiant energy over a comparatively narrow but significant wavelength range an interference filter is comparatively economical and specific. These are typical commercially-available items, such as are prepared by evaporating thin metal layers and dielectric layers on to a prepared surface such as glass, with the thickness of the layers determining the wavelength transmitted. For the present purpose, an interference filter, such as the "Balzar" or a "Schott" interference filter with a peak transmission around 3280 to 3320 Angstroms is preferred. A half peak width of 100 to 200 Angstroms and no appreciable transmittance below 3000 Angstroms or above 3900 Angstroms is preferred. An interference filter having a comparatively narrow pass band and a peak between 3250 and 3350 Angstroms transmits a wavelength range in the ultraviolet region which is particularly significant, because the energy spectrum in this range is representative of that portion of the ultraviolet spectrum of particular interest in determining aging and weathering of most plastics.

Adjacent to the interference filter is a photosensitive cell 14, which is a barrier layer cell which responds in the ultraviolet range. One such device is the "A 15 M Photocell" supplied by International Rectifier Company. The output from this photo-sensitive cell is shunted by a stabilizing resistor 15. A stabilizing resistor of 390 ohms connected directly across the terminals of the above photocell gives a response which is linear over the energy ranges of primary interest. The interference filter is preferably attached to the face of the barrier layer cell with a light-tight seal 16, which conveniently, also, is tight enough to be dust proof and fume proof. The output of the photocell is measured by a millivolt potentiometer 17. A potentiometer having a range of 0 to 120 millivolts covers the usually useful ranges. An ordinary millivolt meter having this range would be useful for approximate calibrations. A millivolt potentiometer, however, is much more accurate and can be accurate to at least three or four significant figures. Temperature control enhances the accuracy.

The millivolt potentiometer is conveniently a commercial item having the accuracy sought and in its simpler configurations is diagrammatically represented by a battery 18 in series with a voltage adjusting resistor 19, the output of which battery and resistor is shunted by a standardizing potentiometer 20 calibrated and set for the output of a standard cell 21. The slide contact and the standard cell are in series with a standardizing galvanometer 22 and a single contact normally open switch 23. The value on the standardizing potentiometer 20 is set to the output potential of the standard cell, and the voltage adjusting resistor adjusted to null the galvanometer, using the switch 23. The battery and voltage adjusting resistor are additionally shunted by the reading potentiometer 24, the slider of which is connected through an output galvanometer 25. As the potential across the reading potentiometer is adjusted to a calibration value, the adjustment to the null of the output galvanometer gives an exact reading of the potential developed by the barrier layer photocell across the stabilizing resistor. More complex standard potentiometers can be used as off-the-shelf items.

The reading of the device is not inherently in absolute units and, hence, must be calibrated. Chemical actinometry or a standard lamp conveniently can be used. A flat tungsten ribbon standard lamp can conveniently be used in back of an interference filter with a photomultiplier tube of high ultraviolet sensitivity and a calibration attenuator to measure the comparatively low radiant energy from the standard tungsten lamp, and with the attenuator, the much higher intensity from a xenon arc lamp to attain a temporary calibration value of a xenon lamp in a desired spectral region. Essentially concurrently therewith, the present barrier layer cell calibrator is calibrated from the temporary calibration of the xenon lamp. Once calibrated the present light calibrator is stable. In typical results the output has been in the range of 45 to 55 millivolts, and when used on calibration duty for about an hour a day for each working day is found to remain stable within 4% for periods of at least about a year.

Modifications in the filter system and sensitivity of the readout suggest themselves to those skilled in the art as the pass band and sensitivity are selected based on specific requirements.

Having described certain modifications thereof, and exemplified the same as my invention, I claim:

1. A method of calibrating a high intensity ultraviolet radiation source against a known standard comprising:

selecting only that spectral portion from such source having a peak between about 3250 and 3350 Angstroms, a one-half peak width of less than about 200 Angstroms, and no effective portion less than 3000 Angstroms, or above 3900 Angstroms, accurately proportionally reducing the selected portion, selecting the spectral radiation from a standard tungsten ribbon lamp having a peak between about 3250 and 3350 Angstroms, a one-half peak width of less than about 200 Angstroms, and no effective portion less than 3000 Angstroms, or above 3900 Angstroms, measuring separately (1) the selected radiation from the said tungsten source, and (2) the proportionally reduced selected portion of radiation from the said high intensity ultraviolet source by a sensitive photomultiplier tube, calculating therefrom the intensity of the said ultraviolet source; and thereby obtaining a temporary calibration of the high intensity ultraviolet radiation source, and essentially concurrently therewith, while the temporary calibration is still valid, passing a portion of said high intensity radiation having a peak between about 3250 and 3350 Angstroms, a one-half peak width less than about 200 Angstroms, and no effective portion less than 3000 Angstroms, or above 3900 Angstroms onto a barrier layer photocell, having a stabilizing resistor shunted across its output, and measuring accurately, preferably to at least three significant figures, the output voltage, and thereby establishing a calibration for such barrier cell.

References Cited
UNITED STATES PATENTS

| | | | |
|---|---|---|---|
| 2,111,585 | 3/1938 | Falge | 88—23 |
| 2,167,803 | 8/1939 | Graham et al. | 250—217 X |
| 2,245,124 | 6/1941 | Bonn | 250—212 X |
| 2,382,439 | 8/1945 | Osborn | 250—212 X |
| 2,472,381 | 6/1949 | McMaster | 250—212 X |
| 2,755,704 | 7/1956 | Gilbert | 250—210 X |

RALPH G. NILSON, *Primary Examiner.*

M. A. LEAVITT, *Assistant Examiner.*